(12) United States Patent
Cakmakci et al.

(10) Patent No.: US 11,249,312 B2
(45) Date of Patent: Feb. 15, 2022

(54) COLOR-CORRECTED CURVED OPTICAL SEE-THROUGH THIN LIGHTGUIDE WITH LARGE FIELD OF VIEW IN EYEWEAR FORMFACTOR

(71) Applicant: GOOGLE LLC, Mountain View, CA (US)

(72) Inventors: Ozan Cakmakci, Sunnyvale, CA (US); Daniel Corbalan, San Francisco, CA (US); Benjamin McLaughlin Gallant, Santa Cruz, CA (US); Carlin Vieri, Menlo Park, CA (US); Juseok Lee, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/864,813

(22) Filed: May 1, 2020

(65) Prior Publication Data

US 2021/0341739 A1    Nov. 4, 2021

(51) Int. Cl.
  *G02B 27/01* (2006.01)
  *G02C 11/00* (2006.01)

(52) U.S. Cl.
  CPC .......... *G02B 27/0172* (2013.01); *G02C 11/10* (2013.01); *G02B 2027/0178* (2013.01)

(58) Field of Classification Search
  CPC ........ G02B 27/0172; G02B 2027/0178; G02C 11/10
  See application file for complete search history.

(56) References Cited

U.S. PATENT DOCUMENTS

| | | | |
|---|---|---|---|
| 6,650,448 B2 | 11/2003 | Nakamura et al. | |
| 8,033,706 B1 | 10/2011 | Kelly et al. | |
| 10,338,390 B2 | 7/2019 | Cakmakci et al. | |
| 2011/0187993 A1* | 8/2011 | Alonso Fernandez | G02C 7/068 351/159.42 |
| 2012/0224260 A1 | 9/2012 | Healy et al. | |
| 2016/0274361 A1* | 9/2016 | Border | G02B 27/017 |
| 2017/0205618 A1* | 7/2017 | Basset | G02B 6/0036 |
| 2017/0293143 A1 | 10/2017 | Martinez et al. | |
| 2019/0079234 A1 | 3/2019 | Takagi et al. | |
| 2019/0171285 A1 | 6/2019 | Sulai et al. | |

OTHER PUBLICATIONS

International Search Report and Written Opinion dated Apr. 12, 2021 for International Application No. PCT/US2020/063754, 17 pages.
Non-Final Office Action dated Jun. 7, 2021 for U.S. Appl. No. 16/942,307, 21 pages.
Notice of Allowance dated Oct. 7, 2021 for U.S. Appl. No. 16/942,307, 8 pages.

* cited by examiner

*Primary Examiner* — Robert J Michaud

(57) ABSTRACT

An optical device includes a display that emits light toward a lightguide. Display light reflects from lightguide surfaces by total internal reflection (TIR). The display is mounted proximate to the lightguide. The optical device includes a first surface at an eye-side of the optical device and a second surface at a world-side. The optical device includes a first material having a first Abbe number and a second material having a second Abbe number different from the first Abbe number. The first material and the second material cause a color correction to light from the display or alters a chromatic aberration of the light from the display. A head mountable frame supports the display and the lightguide including the first and second materials.

20 Claims, 11 Drawing Sheets

| | SURFACE 318 |
|---|---|
| X2 | -8.8614E-03 |
| X3 | -4.0628E-05 |
| Y3 | 9.3903E-06 |
| X2Y2 | -6.0409E-07 |
| X5 | -5.7715E-07 |
| X2Y3 | -- |
| X6 | 2.9349E-08 |
| X3Y3 | -- |
| Y6 | -- |
| X3Y4 | -- |
| XY | -4.1354E04 |
| X2Y | 2.2094E-05 |
| X4 | -1.8180E-06 |
| XY3 | -8.5840E-07 |
| X4Y | -- |

(CONTINUED)

| | SURFACE 318 |
|---|---|
| XY4 | -5.4460E-07 |
| X5Y | -- |
| X2Y4 | -- |
| X5Y2 | -- |
| XY6 | -- |
| Y2 | -1.0381E02 |
| XY2 | 3.5264E-05 |
| X3Y | -7.0876E-07 |
| Y4 | 7.7810E-07 |
| X3Y2 | -4.7377E-07 |
| Y5 | 2.8614E-08 |
| X4Y2 | 1.1662E-08 |
| XY5 | -- |
| X4Y3 | -- |

SAG COEFFICIENTS TABLE

| | SURFACE 608 |
|---|---|
| X2 | -1.9575E-01 |
| X3 | 4.9210E-02 |
| Y3 | 4.8332E-04 |
| X2Y2 | -7.7613E-04 |
| X5 | 3.3790E-04 |
| X2Y3 | 1.6892E-05 |
| X6 | -8.7974E-06 |
| X3Y3 | -2.6855E06 |
| Y6 | -1.3133E-06 |
| X3Y4 | 1.4374E-07 |
| XY | 2.4712E-02 |
| X2Y | -6.1957E-03 |
| X4 | -5.6316E-03 |
| XY3 | -5.6110E-05 |
| X4Y | -3.0604E-05 |

(CONTINUED)

| | SURFACE 608 |
|---|---|
| XY4 | 1.0059E-05 |
| X5Y | 5.7290E-07 |
| X2Y4 | -4.4267E-06 |
| X5Y2 | -1.0801E-07 |
| XY6 | 9.2831E-08 |
| Y2 | -2.0986E-02 |
| XY2 | 6.5985E-03 |
| X3Y | 6.4800E=04 |
| Y4 | 2.1130E-04 |
| X3Y2 | 5.3322E-05 |
| Y5 | -6.8057E-06 |
| X4Y2 | -5.9925E-07 |
| XY5 | 6.7979E-07 |
| X4Y3 | 1.2680E-07 |

SAG COEFFICIENTS

FIG. 13

GLOBAL MEASUREMENTS ON EYESIDE SPHERE VERTEX

| | X | Y | Z | ALPHA_ROT | BETA_ROT | GAMMA_ROT |
|---|---|---|---|---|---|---|
| EYESIDE 615 | 0.00000 | 0.00000 | 0.00000 | 0.0000 | 0.0000 | 0.0000 |
| COMBINER 117 | 0.00000 | 0.00000 | 2.90000 | -1.6124 | 23.6000 | 0.0000 |
| WORLDSIDE 613 | 0.00000 | 0.00000 | 5.80000 | 0.0000 | 0.0000 | 0.0000 |
| DOUBLET_SPH | 0.48470 | 0.00000 | -4.84147 | -0.3178 | -7.7070 | 0.0000 |
| INCOUPLER 608 | 10.00000 | -0.15352 | -3.26796 | 1.8020 | 44.9782 | -1.0831 |
| FIELDLENS_1 | 19.67104 | -1.00000 | 0.23235 | 177.2592 | -3.4363 | -179.2724 |
| COVERGLASS | 21.12762 | -0.84795 | -3.27411 | 177.8170 | -22.5389 | -179.2136 |
| IMAGEPLANE | 21.39594 | -0.81994 | -3.92003 | 177.8170 | -22.5389 | -179.2136 |

COLOR-CORRECTED CURVED OPTICAL SEE-THROUGH THIN LIGHTGUIDE WITH LARGE FIELD OF VIEW IN EYEWEAR FORMFACTOR

BACKGROUND

Some wearable electronic eyewear devices incorporate a near-to-eye optical system to display content to a user. Some devices display only a computer-generated image (CGI), while other types of devices are capable of superimposing a CGI over a real-world view. This latter type of device typically includes some form of see-through eyepiece and can serve as a hardware platform for implementing augmented reality (AR).

Electronically enhanced eyewear devices have multiple practical and leisure applications but many of these applications are limited due to quality, cost, size, weight, thickness, field of view, and efficiency of optical systems used to implement existing eyewear devices. For example, use of conventional components typically yields a CGI of only a few degrees width and a few degrees of height resulting in a poor user experience. Previous eyewear designs have attempted to address the limitations of these types of devices in various ways such as by employing curved lightguides in conjunction with a micro-display ("display") positioned in a temple region of a head wearable frame similar to a conventional pair of glasses. However, based on the particular geometry and physical constraints of these designs, the lightguide in front of the eye restricts a light path, including the number of reflections between an in-coupler and an out-coupler, to allow for concealing of the optics within the temple region. In addition, conventional constraints in positioning components of certain eyewear devices lead to a low field of view (FOV) for the display. Further complicating the geometry of various components is the particular light source used to project content toward a user eye. For example, different emission spectra of light from various types of electronic displays, such as different spectra from OLED and LED displays, can lead to chromatic aberration depending on the composition of the various lens components in the particular eyewear device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 12-14 illustrate sets of example coefficients characterizing certain surfaces of an eyewear device in accordance with some embodiments.

DETAILED DESCRIPTION

Figure 1:
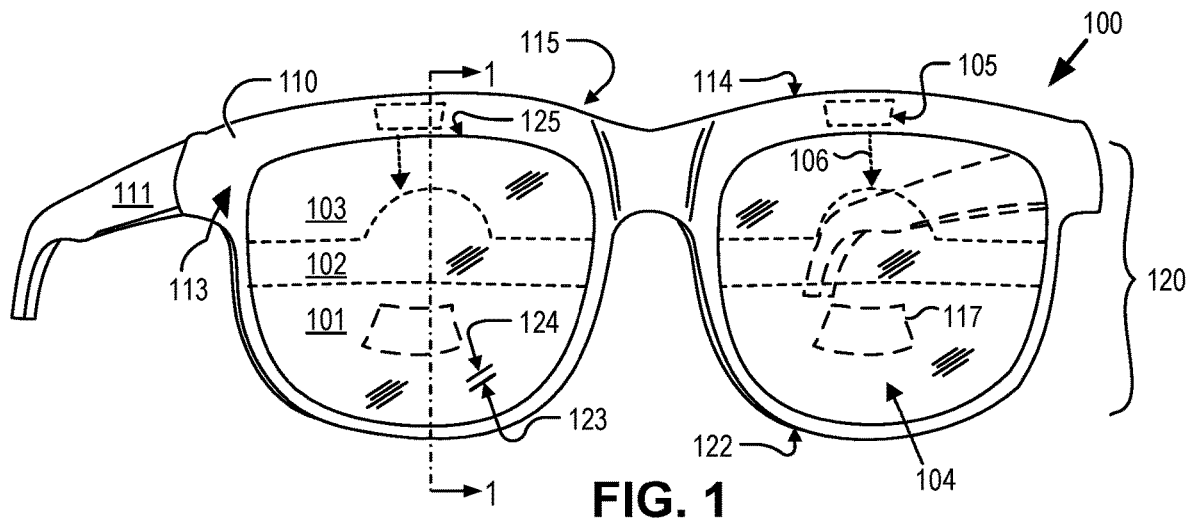
FIG. 1 illustrates a perspective view of an eyewear device having components for altering a chromatic aberration in accordance with some embodiments.

Previous designs of lightguides placed a microdisplay ("display") at a temple position of a head-mountable display (HMD) device or a transparent heads up display (HUD) device. The various arrangements of components in these devices have led to a lengthy light path (e.g., a light path having four reflections or "bounces") that is prone to chromatic aberrations and yields a low field of view (FOV) on the order of approximately ten degrees diagonal or less in a viewable image. Increasingly, microLED and organic light-emitting diode (OLED) displays are being used in these types of devices. MicroLED and OLED displays generally emit light over a broad frequency range, wider than some other types of displays including currently popular liquid-crystal-on-silicon (LCOS) displays. The LCOS displays generally have a narrow and peaky emission spectrum with relatively high luminance. OLED displays are typically dimmer than LCOS displays, but have a higher contrast ratio and wider emission spectrum. Using certain components, techniques described herein mitigate chromatic aberrations in these displays, and the techniques and described embodiments are suited for use with microLEDs and OLEDs in HMD and HUD devices. A result is substantive improvement in the image quality perceived by the user from OLED and OLED-like displays and other displays having wide light emission spectra.

Embodiments described herein use at least two materials having two different Abbe numbers to color correct light from a broad-spectrum display in an eyewear device. By way of analogy, the two differing materials act as a classical doublet for color correction. Color correction as used herein includes adjusting or altering a chromatic aberration. Embodiments of the eyewear devices create an improved augmented reality (AR) experience for a user. Further benefits are provided by using one or more curved lens surfaces as part of a compact and lightweight lightguide that directs light from the broad-spectrum display to the user eye. The techniques described herein are particularly advantageous for OLED and active-matrix OLED (AMOLED) displays which emit light of a relatively broad spectrum when compared with other display technologies (e.g., LCOS displays, light-emitting diode (LED) displays, liquid crystal displays (LCDs), TFT (thin-film-transistor) LCD displays). Reference to a lightguide herein includes one or more components that reflect light according to substantial or total internal reflection (TIR) between lightguide surfaces. Described embodiments combine a lightguide with certain components into an AR-based device where ambient light is combined with display light to provide a combined image to the user eye.

Embodiments described herein relate to see-through HMD devices such as glasses, helmets, and windshields which merge computer generated and real-world light to form a combined view or combined image to the user eye. To improve over previous geometries, according to certain embodiments, a display having a relatively broad light frequency output is placed at the top of a curved lightguide and two or more types of materials are used in elements of the HMD device to alter and thereby mitigate chromatic aberrations. Use of two or more materials in the elements in the light path perform analogously to a classic geometrical lens doublet. Doublets are used for color correction and are formed with materials having different Abbe numbers and, optionally, with different optical signs with respect to optical power. For example, a first material is coupled to (e.g., cemented to, positioned adjacent to) a second material where the first material has a first (positive) optical power and a first Abbe number and the second material has a second (negative) optical element with a second Abbe number different from the first Abbe number. In some embodiments, the first and second materials have respective and complementary chromatic aberrations and are positioned relative to one another so as to reduce or eliminate one or more chromatic aberrations of light from an electronic display for a particular light frequency or range of frequencies.

FIG. 1 illustrates a perspective view of an optical eyewear device 100 having components for altering a chromatic aberration in accordance with some embodiments. The device 100 broadly illustrates components of various types of eyewear devices and can be applied in various environments as further described herein. The device 100 is binocular, has an appearance of ordinary glasses, has little to no light leakage from an electronic display mounted therein, has a relatively small (e.g., less than approximately 14 mm) temple height in which to house at least the electronic components, supports a curved lightguide, is relatively efficient with respect to light emitted from the display, has approximately a 40 degree diagonal field of view (FOV) in a resulting image from the display, and works with an OLED panel.

The device 100 includes one or a pair of lightguides 120 mounted in a frame 110, one lightguide 120 for each user eye (not illustrated). The frame 110 secures the lightguides 120 between a top side 114 and a bottom side 122 thereof. The frame 110 is shaped into a form similar to an ordinary pair of eyeglasses. Generally, the lightguides 120 are transparent and operate as lenses for viewing in front of a user and for directing light 106 from a display 105 toward the user eye thereby providing an AR-based view when wearing the device 100.

Each lightguide 120 includes a set of three components 101, 102, 103 where each component is shaped and positioned with respect to one another to alter the light 106 from the display 105. For a respective display 105, the lightguide 120 includes a surface having a dielectric or metal mirror coating that acts as a combiner 117. The combiner 117 reflects the light 106 originating from the display 105 toward an eye-ward side 115 of the eyewear device 100 and combines the light 106 with light 104 from a world-side 113. The light 104 passes through to the eye-side 115 of the lightguide 120 and the light 104 originates from a viewable scene on the world-side 113 of the eyewear device 100.

As illustrated, each display 105 is mounted above a top edge 125 of a respective lightguide 120 at the top side 114 of the frame 110. The lightguide 120 allows ambient light 104 to combine with display light 106 reflected at the combiner 117. The frame 110 includes two arms 111 that extend from a temple location of the frame 110 on respective sides of the frame 110 toward and over ears of the user (not illustrated). In some embodiments, the device 100 includes or houses components to receive and provide an image data signal to the displays 105. The image data signal is a source input for the display light 106. For example, one arm 111 includes wireless components for receiving a wireless signal that includes the image data signal. Power is provided by a local energy source such as a battery, solar panel, or other form of energy local to the device 100. In another example, a cord serves as a mechanism to provide power from an external source to various components including the display 105 and its electronic package. Besides wires for power, the cord also includes one or more wires that deliver the image data signal to the displays 105. In certain embodiments, the image data signal originates from a computing device or other display driving data source (not illustrated).

The placement of the display 105 at the top of the lightguide 120 is combined with various features of the lightguide 120 such as having a curved eye-side surface 124 and a curved world-side surface 123. According to certain embodiments, these curved surfaces 123, 124 are spherical in at least one dimension (e.g., uniform along a fixed radius with respect to a focal point of the respective lightguide 120), and each of these curved surfaces 123, 124 has a similar or approximately a same sized characteristic dimension (e.g., spherical dimension, radius, set of curvature parameters) as each other so as to implement a zero optical power (diopter) optical see-through function. Further details about the device 100 are provided below in reference to other figures. The world-side surface 123 is a first surface and the eye-side surface 124 is a second surface. Each of the surfaces 123, 124 is provided by a same or a different physical component in the device 100. A surface at the top of the lightguide 120, according to certain embodiments, is curved or freeform so as to correct for astigmatism, if any, with respect to the display 105 and light 106 emitted therefrom. The surface at the top of the lightguide 120 is a third surface of the device 100 and is curved in one or two dimensions with respect to the resulting image at the eye-ward side 115 of the device 100.

Another (fourth) surface of the lightguide 120, such as a surface at the combiner 117, provides a final reflection of light 106 from the display 105 toward a user eye, and this surface of the combiner 117 is also curved in a freeform manner in at least some embodiments. This final surface is referred to equally herein as the combiner 117 or the combiner surface. The image reflected therefrom is referred to as a light field and is provided to the user eye. In other embodiments of the combiner 117, the final reflection surface of the lightguide 120 is a rotationally symmetric aspherically-shaped surface, an anamorphic aspherically-shaped surface, a toroid-shaped surface, a Zernike polynomial-shaped surface, a radial basis function-shaped surface, an x-y polynomial-shaped surface, or a non-uniform rational b-spline-shaped surface. In some embodiments, at least some of the components of the lightguide 120 of the device 100 operate, due to their arrangement relative to one another and their composition and shape, as an optical magnifier for the light 106 emitted from the display 105. The techniques described herein are applicable to all types of see-through devices, such as eyeglasses, helmets, head-mounted display (HMD) devices and windshields and enable optical merging of computer generated and real-world scenes to form a combined view even though just an eyewear device such as the eyewear device 100 is described and illustrated.

Figure 2:
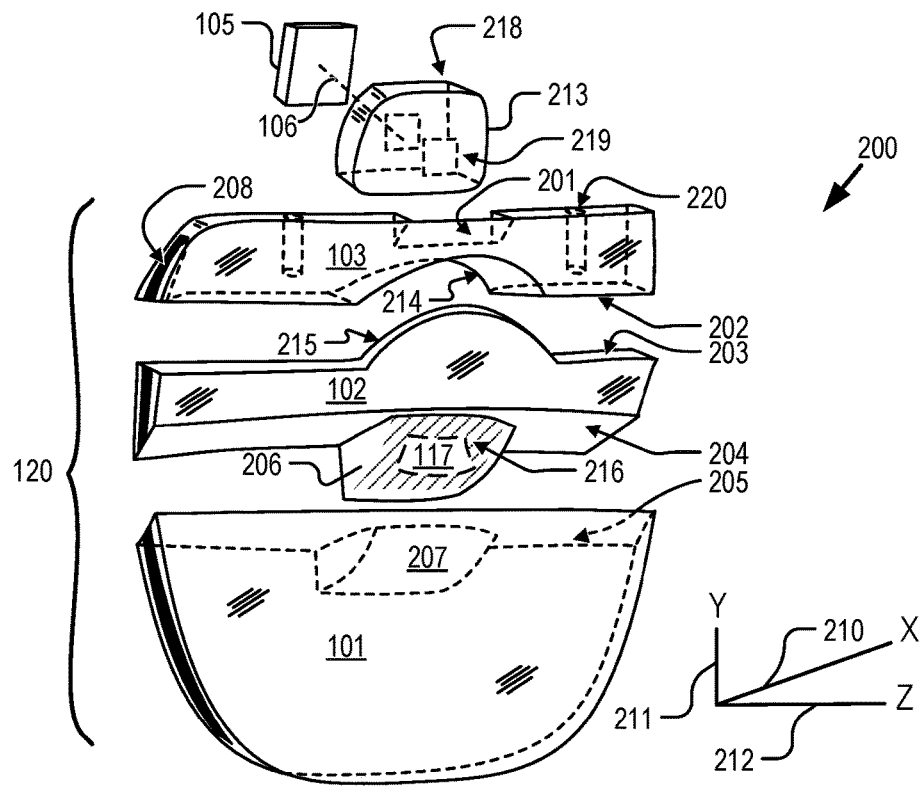
FIG. 2 and FIG. 3 illustrate perspective views of components of the eyewear device illustrated in FIG. 1 in accordance with some embodiments.

FIG. 2 illustrates an exploded perspective view of some components of the eyewear device 100 illustrated in FIG. 1 according to some embodiments. A set of components 200 of the eyewear device 100 includes a first lightguide component 101, a second lightguide component 102, and a third lightguide component 103 that together make up the lightguide 120. While three components 101-103 are illustrated, the lightguide 120 includes one or more components depending on the particular embodiment and other components in any particular eyewear device using the techniques described herein.

In the lightguide 120, a bottom (second) surface 202 of the third component 103 is positioned adjacent to a top (first) surface 203 of the second component 102. A bottom (second) surface 204 of the second component 102 is positioned adjacent to a top (first) surface 205 of the first component 101. In the device 100, a field lens 213 receives light 106 from the display 105 and directs the light 106 into a first (top) surface 201 of the third component 103 of the lightguide 120. The light 106 enters a first side 218 of the field lens 213 and exits a second side 219 of the field lens 213. The first and second sides 218, 219 are substantially planar or curved depending on a shape of one or more surfaces 201-205 of the components 101-103 and depending on a desired shape of a resulting image from the display 105 that reaches the user eye. For example, the first side 218 of the field lens 213 is substantially planar thereby matching a substantially planar surface from which light 106 is emitted from the display 105, and the second side 219 is curved so as to optically increase a size of a resulting image from the display 105 that reaches the user eye.

In some embodiments, the components 101-103 are positioned, fused, glued, cemented, or otherwise formed into a single unit prior to or for assembly of the device 100. The display 105 and the field lens 213 are positioned inside of the frame 110 above the first surface 201 of the third component 10. In some embodiments, some or all of the display 105 and the field lens 213 are hidden from view inside of the frame 110. One or more of the lightguide components 101-103 include one or more recesses 208 or other surface feature at an outer edge of the lightguide 120 to facilitate holding the lightguide 120 into the frame 110 thereby holding the lightguide 120 in a fixed position relative to the field lens 213 and the display 105. For example, the third component 103 includes a pair of cylindrical recesses 220 for receiving a post or screw (not illustrated) to secure the lightguide 120 in the device 100. The lightguide 120, when assembled into the frame 110, allows the device 100 to have an appearance of ordinary eyewear yet to have the functionalities of AR-based system as described herein.

In some embodiments, to further shape the resulting image from the display 105 that reaches the user eye, the second surface 204 of the second component 102 includes an extended surface 206 that is shaped to conform to a recessed surface 207 in the first surface 205 of the first component 101. The extended surface 206 is curved along at least one axis relative to a plurality of references axes 210-212 (e.g., an X axis 210, a Y axis 211, and a Z axis 212). For example, the extended surface 206 is curved in a freeform manner along a first axis, along a second axis, or along both the first and second axes relative to a light path of light 106 from the display 105 in the lightguide 120.

The extended surface 206 includes a dielectric mirror coating 216 that reflects some or all of the incident light 106 from the lightguide 120 to the user eye. For example, a plurality of layers of a dielectric material is applied onto the extended surface 206 so as to reflect at least 20% of the display light 105 directed into the lightguide 120 toward the user eye. In other embodiments, the dielectric material as applied on the surface 206 has an approximately 20% reflectivity for the light 106 incident thereon. An amount and reflective quality of reflectivity of the coating 216 is matched to an amount of light 106 emitted from the display 105 or an amount of power consumed thereby. The dielectric mirror coating 216 is a partial mirror coating and covers at least a sub-region of the combiner 117.

In some embodiments, the first surface 203 of the second component 102 includes a convex portion 215 that is shaped to match a concave portion 214 of the second surface 202 of the third component 103. these surfaces 202, 203 are shaped to magnify light 106 from the display 105. In some embodiments, the third component 103 is made of a first material having a first Abbe number and the second component 102 is made of a second material having a second Abbe number different from the first Abbe number. Together, the second and third components 102, 103 alter a chromatic aberration of the light 106 as it passes through these components 102, 103. In other embodiments, the field lens 213 is made of a first material having a first Abbe number and the third component 103 is made of a second material having a second Abbe number different from the first Abbe number. Together, the field lens 213 and third component 103 alter a chromatic aberration of the light 106 as it passes through these components 213, 103. As another example of chromatic aberration correction, the field lens 213 is made of a first material having a first Abbe number and the second component 102 is made of a second material having a second Abbe number different from the first Abbe number. Together, the field lens 213 and second component 102 alter a chromatic aberration of the light 106 as light 106 passes through these components 213, 102.

Figure 3:
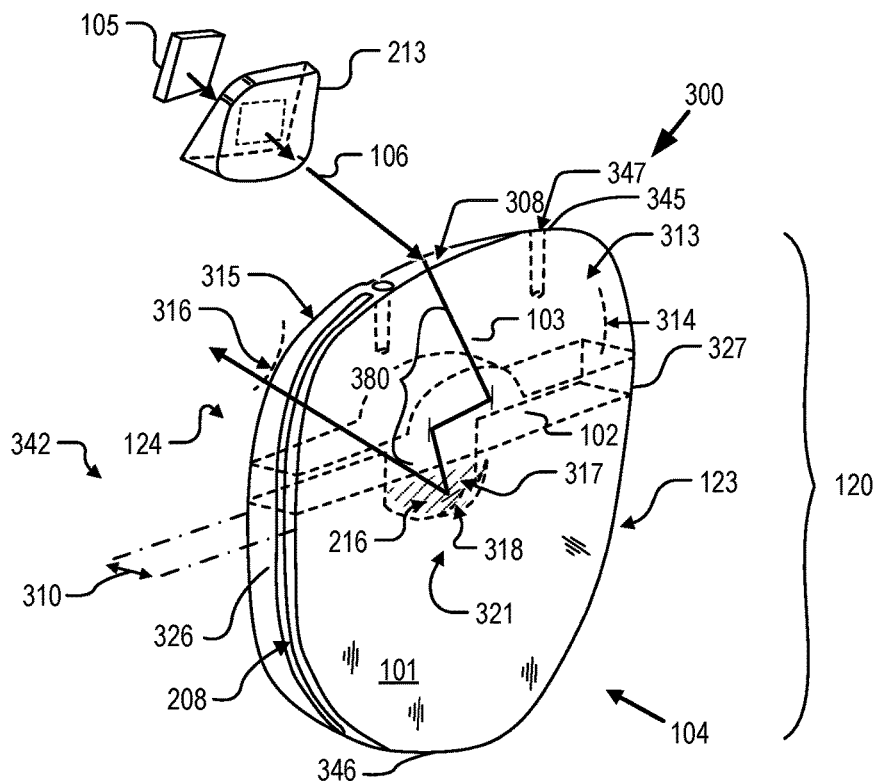

FIG. 3 illustrates another perspective view 300 of some components of the eyewear device 100 illustrated in FIG. 1 according to some embodiments. A set of components of an eyewear device 100 includes the lightguide 120, the field lens 213, and the display 105. The lightguide 120 includes the three components 101, 102, 103. Together, the three components 101, 102, 103 of the eyewear device 100 facilitate an appearance of ordinary eyewear and provides a combined view of world-side light 104 and display light 106 and the functionalities as described herein. The view 300 illustrates a light path 380 within the lightguide 120 according to some embodiments.

A combiner curvature 318 of a combiner surface 317 of the first lightguide component 101 is visible at a bottom 321 of the light path 380 where display light 106 makes a final reflection toward a user eye (not illustrated). At least one of the three lightguide components 101-103 has an eye-side curvature 316 of its eye-side surface 315 on the eye-side 124 of the lightguide 120. At least one of the three lightguide components 101-103 also has a world-side curvature 314 of its world-side surface 313 on the eye-side 124 of the lightguide 120.

The lightguide 120 includes a world-side surface 313 having a world-side curvature 314 and an eye-side surface 315 having an eye-side curvature 316. The world-side surface 313 and the eye-side surface 315 are formed or otherwise positioned relative to an incoupler surface 308 so as to allow for total internal reflection (TIR) of the display light 106 between the two surfaces 313, 315 as the light 106 travels between the top of the lightguide 120 and the combiner surface 317. Display light 106 enters the incoupler surface 308 within approximately 2-3 degrees of a normal of the incoupler surface 308. While illustrated as a same part of the third component 103, the incoupler surface 308 is part of a separate component of the lightguide 120 in some embodiments.

The display light 106 reflects from each of the two surfaces 313, 315 one or more times on each surface 313, 315 before reflecting from the combiner surface 317 when traveling toward the user eye. In certain embodiments, the display light 106 has at least two total internal reflection interactions with the surfaces of the lightguide 120 such as the surfaces 313, 315. In many embodiments, the two surfaces 313, 315 are positioned within about 4.0 mm of each other. In certain embodiments, the lightguide thickness 310 is approximately 4.5 mm or less as measured at any perpendicular distance between the surfaces 313, 315 along the lightguide 120 from a top 345 to a bottom 346 of the lightguide 120, but the lightguide thickness 310 can vary as needed depending on the various components used to make up the lightguide 120 and the orientations of these components to create a final AR image for the user by way of the lightguide 120. The lightguide thickness 310 as used herein is a distance between the world-side surface 313 and a closest point or a point opposite at the eye-side surface 315.

Display light 106 from the display 105 and ambient light 104 from the world-side 123 of the lightguide 120 are combined in the combiner surface 317. The display 105 includes light emitting elements (e.g., passive- or active-matrix organic light-emitting or organic electroluminescent diode (OLED)) and is supported electronically and mechanically by a set of components grouped together in a package as known to those in the art. Display light 106 emitted from the display 105 travels to the field lens 213 and then into the lightguide 120. In other embodiments, display light 106 is first reflected from a surface or reflector that is located interior to the frame 110 and then passes into the lightguide 120 as shown by the light path 380 in the lightguide 120.

In some embodiments, the lightguide 120 includes an outer groove 208 in an outer edge 326 and an inner edge 327. The outer groove 208 extends from the top side 345 to the bottom side 346 to provide for a surface feature for mounting purposes. In certain embodiments, the outer groove 208 is also formed in the top side 345 and the bottom side 346 of the lightguide 120. The outer groove 208 along the edges 326, 327 and sides 345, 346 mate to a ridge of a frame (not illustrated) or other surface feature thereof so as to hold the lightguide 120 fixed in the frame as shown in the frame 110 of FIG. 1. In FIG. 3, the lightguide 120 also includes one or more features such as one or more passages 347 into or through the lightguide 120 for receiving fasteners (not illustrated) to hold a display housing (illustrated in FIG. 7) and the display 105 at a fixed position and orientation at the top side 345.

Figure 4:
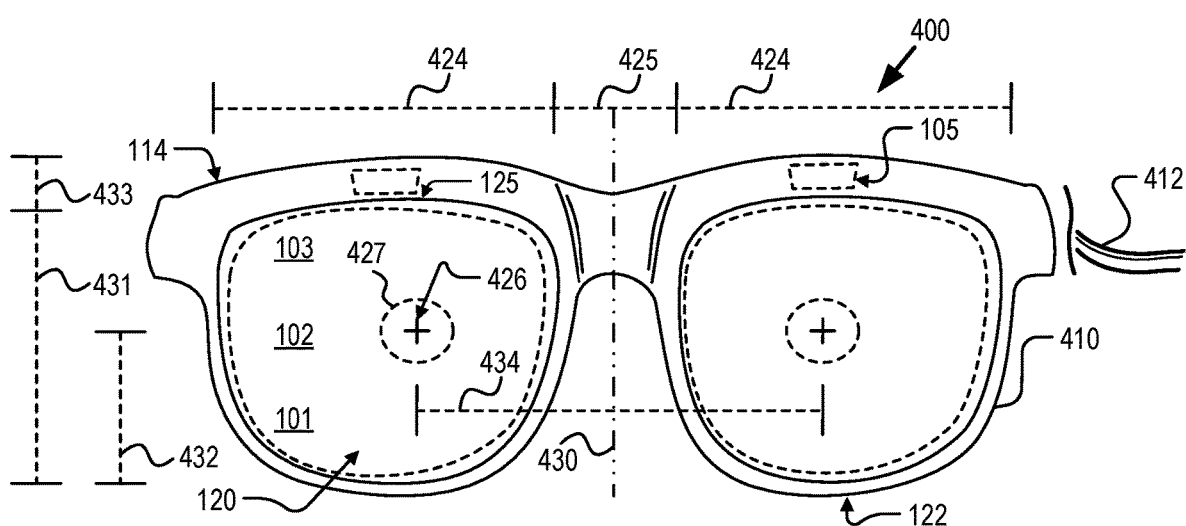
FIG. 4 illustrates a front view of a rim frame portion of the eyewear device illustrated in FIG. 1 in accordance with some embodiments.

FIG. 4 illustrates a front view 400 of a rim frame portion 410 of the eyewear device 100 in accordance with some embodiments. Dimensions of the device 100 are based on a pupil diameter 427 of approximately 4 mm positioned relative to a pupil center 426. Each of the lightguides 120 for the left and right eyes (not illustrated) are based on a frame horizontal box distance 424 of approximately 53.3 mm, such as between 50 mm and 60 mm, and a frame vertical box distance 431 of approximately 44 mm, such as between 40 mm and 50 mm. The lightguides 120 are separated by a bridge length 425 of approximately 17.5 mm. The bridge length 425 is generally centered at a medial position 430 when the eyewear device 100 is worn by the user. A fitting height 432 is a distance from the bottom side 122 toward the top edge 125 of the lightguide 120 and the fitting height is approximately 23 mm from the bottom side 122 to the pupil center 426. The rim frame portion 410 is based on an inter-pupillary distance (IPD) 434 in a range of approximately 61 mm to 63 mm.

In terms of example dimensions for the eyewear device 100, a thickness of certain embodiments of the lightguide 120 is up to approximately 5 mm, and preferably up to and within approximately 4 mm. Parts of the optics, including the display 105, take up about 3.5 mm of space hidden in the rim of a top of the frame 110 of the device 100. A top portion of the rim frame portion 410 has a (top) rim thickness 433 of up to 4 mm with some embodiments having a rim thickness 433 of 3.5 mm or less and accommodate the various components including both optical and electronic components other than the lightguides 120. In support of the electronic components, an electronic cord 412 is illustrated and would be coupled to or part of the eyewear arm 111. That is, one or more of the eyewear arms 111 as illustrated in FIG. 1 house a cord 112 having two or more wires to power the various components including the display 105 and its package and to provide an image data signal to the display 105 from a computing device or other display driving data source (not illustrated). In other embodiments, the rim frame portion 410 or one or more arms include or house components to receive and provide the signal wirelessly to the display 105, and power is provided by a battery or other form of energy local to the device 100 or from a source external to the device 100.

In a particular embodiment, the display 105 inside of a rim thickness 433 of the top portion of the rim frame portion 410 provides an image of about a 3:1 ratio width-to-height. The corresponding thickness is approximately 3.5 mm of head space in a top of the rim frame portion 410 (within the rim thickness 433) for housing certain device components. For the display 105 producing an image of about a 8:1 ratio width-to-height, the head space within the rim thickness 433 is up to approximately 3.6 mm. To lighten a weight of the eyewear device 100, certain embodiments are monocular (having just one lightguide 120 and one display 105) in the device 100 while other embodiments have two displays 105, one for each of two lightguides 120.

Figure 5:
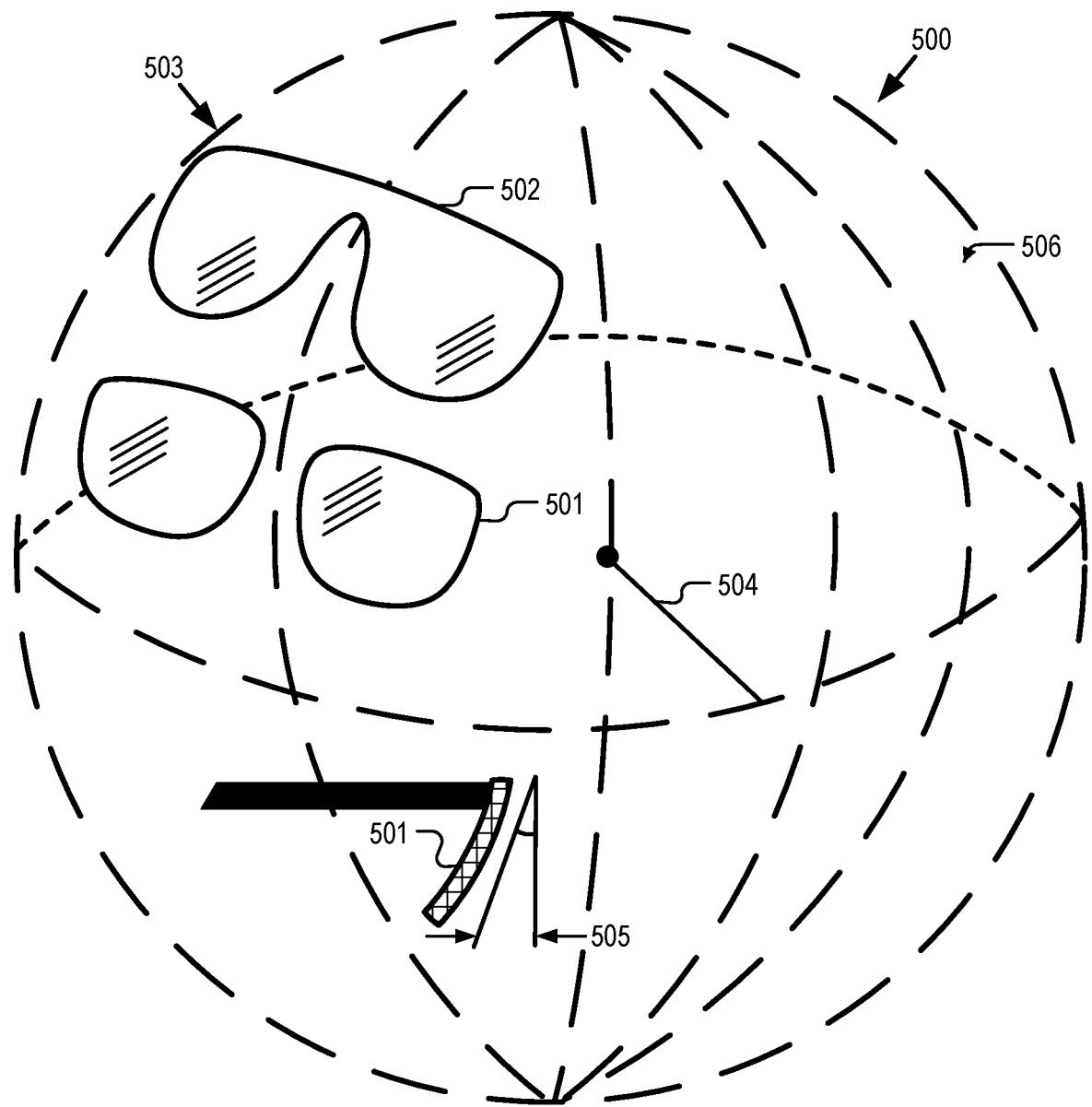
FIG. 5 illustrates a perspective view of a reference sphere and lightguide embodiments of the eyewear device of FIG. 1 in accordance with some embodiments.

FIG. 5 illustrates a perspective view 500 of a reference sphere 503 and embodiments of the lightguide 120 of the eyewear device 100 of FIG. 1 in accordance with some embodiments. For example, a first embodiment includes a separate lightguide 501 for each of a right lens location and a left lens location in the eyewear device 100. Each lightguide 501 has a curvature that matches a radius 504 of the sphere 503. In an alternative embodiment of the lightguide 120, a second embodiment includes a single combined lightguide 502 that includes lightguide components for each of the right and the left lens locations in the eyewear device 100.

The lightguides 501, 502 are shaped so as to effectively be positioned on a shared sphere surface 506 with respect to one of their surfaces. That is, at least one of the lightguide surfaces 313, 315 is spherically shaped with a spherical radius R. By way of example measurements, a radius R of the sphere 303 is approximately 280 mm. A wrap angle of each lightguide 301 is approximately 6.5 degrees. After being formed with a spherical curvature, the lightguides 501, 502 have a pantoscopic tilt 505 of approximately 10 degrees. Generally, the pantoscopic tilt 505 is up to approximately 12 degrees. The interpupillary distance (IPD) 434 is a function of spherical radius R, a pantoscopic tilt angle (PANTO) and a wrap angle (WRAP). For R of 280 mm, PANTO of 10 degrees, and a WRAP of 6.5 degrees, the IPD is approximately 61.2 mm. In some embodiments, a base curve of at least the rim frame portion 410 is approximately a same curvature as the lightguides 501, 502.

Figure 6:
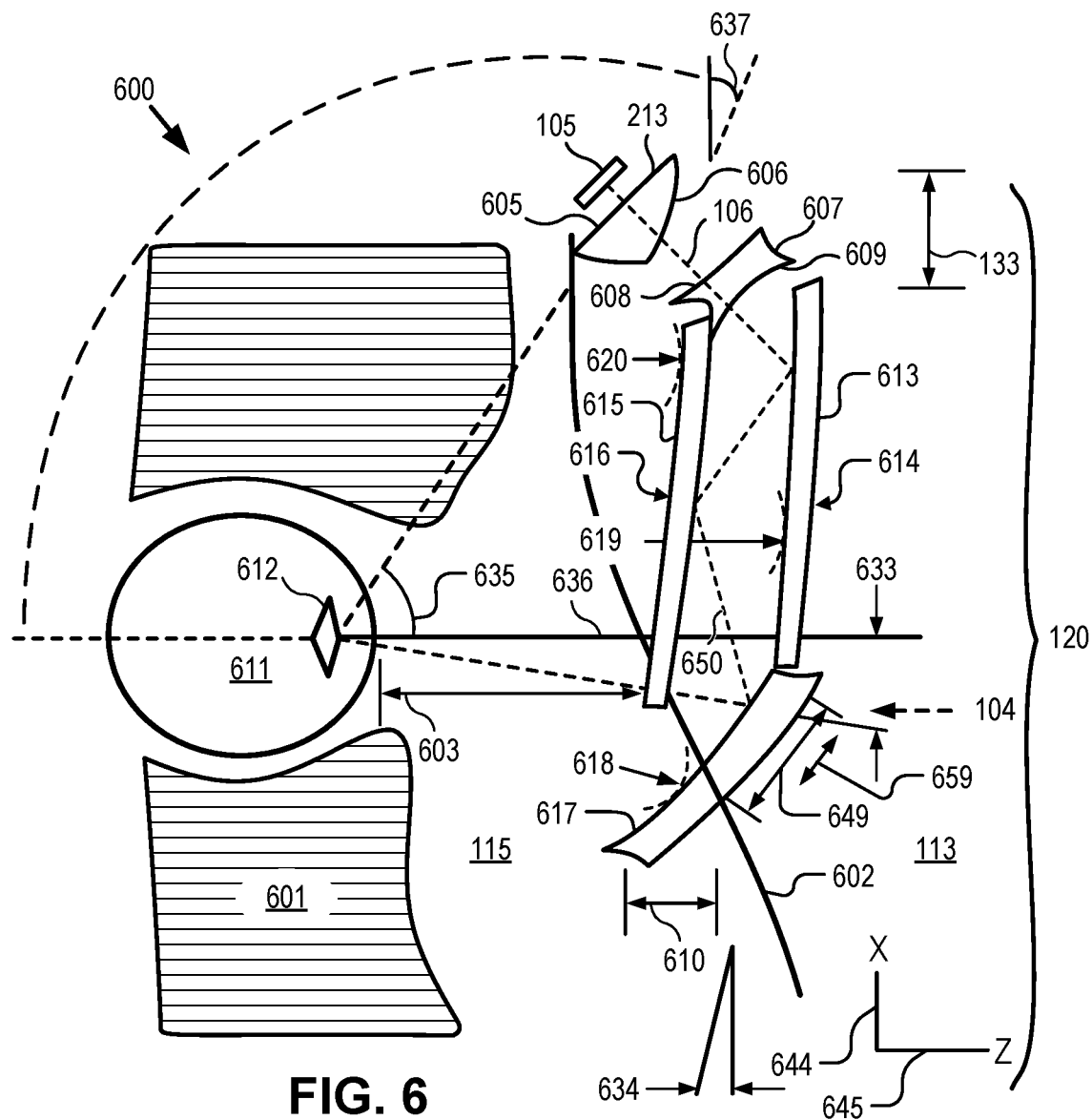
FIG. 6 illustrates a side cross-sectional view of a lightguide, a display, and a field lens along line 1-1 of FIG. 1 on a user in accordance with some embodiments.

FIG. 6 illustrates a side cross-sectional view 600 of a lightguide 120, a display 105, and a field lens 213 along line 1-1 of FIG. 1 in accordance with some embodiments. The view 600 is an optics functional view that assists in providing measurements of the various optical surfaces of the device 100. The view 600 also illustrates the orientation of various components of a device like the eyewear device 100 with respect to an eye 611 of a user 601 and a light path 650 in the device 100. In the view 600, a frame like the frame 110 is not shown for sake of clarity of illustration and numbering. The display 105 is oriented generally downward toward the lightguide 120. The display 105 generates display light 106. The display light 106 travels along the light path 650 toward the eye 611 and its pupil 612. A profile of a nose 602 in front of the eye 611 is visible behind the components and shows the device components relative thereto. While one (right) eye 611 is shown, it is understood that a similar set of components is provided for a second (left) eye of the user 601 as shown in other figures when a second display, field lens and lightguide are provided.

In the view 600, the lightguide 120, the display 105, and the field lens 213 are positioned in front of the eye 611 as shown such that a combiner surface 617 is in front of the eye 611 and the combiner surface 617 is at an intersection of the lightguide 120 and near an optical axis 636 extending horizontally from a center of the pupil 612. The combiner surface 617 has a non-planar combiner curvature 618. The display 105 and the field lens 213 fit within the device rim thickness 433 that is 6.5 mm or less.

In some embodiments, a center of a combiner area 649 or resultant image producing area 659 on the combiner surface 617 provides a resultant image for the eye 611 and is positioned at a first angle 633 below the optical axis 636 as measured at a center of the image on the combiner surface 617. In some embodiments, the first angle 633 is within 4-15 degrees such as at approximately 10-12 degrees. Horizontally (perpendicular to the view 600), the center of the resultant image is approximately 5-10 degrees offset with respect to a center of the eye 611 at rest. For a right eye, the horizontal offset is to the right of the optical axis 636, and for a left eye, the horizontal offset is to the left of the optical axis 636. Ambient light 104 from the world-side 113 of the lightguide 120 passes through the lightguide 120, including the combiner surface 617, and into the pupil 612 and the eye 611.

From the display 105, the display light 106 first passes to, and through, a first surface 605 of the field lens 213 and out of a second surface 606 of the field lens 213. In some embodiments, the field lens 213 is mounted to or held in place by one or more of the frame and the lightguide 120. The field lens 213 is made of a same or a different material than a material of a component 101-103 of the lightguide 120. Based on these materials, one or more of the field lens 213 and the lightguide 120 provide a change to a chromatic aberration (e.g., a color correction) to one or more of the display light 106 and the ambient light 104 in the eyewear device 100. For example, the display light 106 is corrected for the eye 611 such that color separation in a particular light frequency of the display light 106 as this light 106 travels through the optics is magnified less than 1.0 arcminutes before reaching a retina of the eye 611. In some embodiments, this adjustment is less than 0.5 arcminutes based on geometries of the components and materials of manufacture of the components between the display 105 and the eye 611.

The field lens 213 is also referred to as a prism and is a component having one, two, or more features that direct light to a desired location. One of these features is a shape of a first surface 605 or a second surface 606 of the field lens 213. Another of these features is a material of the field lens 213. Yet another of these features is a position of the field lens 213 with respect to a plane of the display 105 or with respect to an incoupling surface 608 and the lightguide 120.

The light 106 is provided with one or more desired characteristics as compared to light leaving the display 105. For example, in some embodiments, the first surface 605 of the field lens 213 is curved along a first axis, along a second axis (e.g., perpendicular to the page containing FIG. 6), or along both a first axis and a second axis. As another example, the first surface 605 is spherical or freeform along one or more of these axes. According to some embodiments, the first surface 605 is positioned at a third angle 635 of approximately 34 degrees above the optical axis 636. The display light 106 passes through a body of the field lens 213 and out a second surface 606 opposite of the first surface 605. The second surface 606 is curved along a first axis, along a second axis, or along both a first axis and a second axis. For example, the second surface 606 is spherical or freeform along one or more of its axes.

Further, the field lens 213 is made of a first material having a first Abbe number and one or more components 101-103 of the lightguide 120 are made of a different second material having a second Abbe number. For example, the first material is a plastic material and the second material is a glass material, or a synthetic resin material such as Zeonex® E48R. The E48R material is part of a cyclic olefin polymer (COP) family of plastic resins with low native stress bi-refringence properties. The E48R material is a resin developed by Nippon Zeon. One grade of E48R has a heat distortion temperature of about 122 degrees C. and an index of refraction of approximately 1.530. As another example, the first material is a polycarbonate (PC) resin (e.g., EP5000 of the Mitsubishi Gas Chemical Company) that has benefits of being transparent and inexpensive. The PC resin has a low birefringence and a high refractive index.

In another example, the field lens 213 is a fluorosilicate, low-index glass material and one or more components 101-103 of the lightguide 120 are made of the E48R material or the EP5000 resin material. In particular, the third component 103 is made of the E48R material and either the field lens 213 or the second component 102 is made of the EP5000 material or the glass material.

In yet another example, the field lens material or a material of the lightguide 120 is one of: an Ohara-brand S-FSL 5Y type glass having a refractive index greater than 1.5 and a (first) Abbe number of approximately 70, a COP resin such as E48R material having a refractive index greater than 1.4 (e.g., approximately 1.530) and a (second) Abbe number of approximately 50-60, and a polyolefin resin having a (third) Abbe number of approximately 20-30 and a refractive index greater than 1.5. Based on use of these materials in the device 100, one or more of the field lens 213 and the lightguide 120 cause a change to a chromatic aberration to one or more of the display light 106 and the ambient light 104 in the eyewear device 100.

A combination of the first material and the second material causes a modification to a chromatic aberration of the display light 106 by the time the display light 106 reaches the eye 611. For sake of clarity, only a single ray of display light 106 is shown within the lightguide 120 in the view 600 for the sake of simplicity and to avoid obscuring components of the lightguide 120. While not illustrated, one or more of the components in the light path 650—such as the display 105, the field lens 213, and the lightguide 120—include one or more coatings for affecting a quality or a quantity of the display light 106 reaching the eye 611. For example, in some embodiments, a coating has a polarization dependent reflectance property with respect to the display light 106 as the light 106 travels in the light path 650. The field lens 213 directs the display light 106 into the incoupler surface 608 of the lightguide 120 or into an air gap between a world-side (first) surface 613 and an eye-side (second) surface 615 of the lightguide 120. The angles of reflection as illustrated do not necessarily reflect actual angles of reflection between the surfaces 613, 615.

In some embodiments, the incoupler 607 is flat or curved where a curvature is spherical or freeform in contour along a first axis, along a second axis, or along both a first axis and a second axis at a top position of the lightguide 120. The curvature of the incoupler surface(s) such as the first surface 608 corrects some or all of an astigmatism in the resulting CGI formed at the combiner surface 617. According to some embodiments, the resulting CGI or FOV thereof is up to approximately 40 degrees horizontal and 14 degrees vertical relative to the eye 611 and the pupil 612. In other embodiments, the FOV has an aspect ratio width-to-height with the horizontal size being approximately 45 degrees and the vertical size being approximately 15 degrees.

The lightguide 120 includes the world-side surface 613 having a world-side curvature 614 and an eye-side surface 615 having an eye-side curvature 616. The world-side surface 613 and the eye-side surface 615 are formed or otherwise positioned relative to the incoupler 607 so as to allow for total internal reflection of the display light 106 between the two surfaces 613, 615 as the light 106 travels between the top of the lightguide 120 and the combiner surface 617. Display light 106 enters the incoupler 607 within approximately 3 degrees of a normal of the incoupler 607. The display light 106 reflects from each of the two surfaces 613, 615 one or more times on each surface 613, 615 before reflecting from the combiner surface 617 when traveling toward the eye 611. In certain embodiments, the display light 603 has at least two total internal reflection interactions with the surfaces of the lightguide 120 such as the surfaces 613, 615. In many embodiments, the two surfaces 613, 615 are positioned within about 4.0 mm of each other and a distance between the surfaces is referred to as a lightguide thickness 610. In certain embodiments, the lightguide thickness 610 is approximately 4.5 mm or less horizontally as measured at any point along the lightguide 120 from a top to a bottom of the lightguide 120, but the lightguide thickness 610 can vary as needed depending on the various components used and the orientations of these components to create a final AR image by way of the lightguide 120. The lightguide thickness 120 as used herein is a distance between the world-side surface 613 and a closest point or a point opposite at the eye-side surface 615.

According to some embodiments, in terms of ranges, along the world-side surface 613, the world-side curvature 614 includes a first spherical curvature 619 having a radius between 180-320 mm at the eye-side. Along the eye-side surface 615, the eye-side curvature 616 includes a second spherical curvature 620 having a radius between 180-320 mm at the eye-side. In some embodiments, the first spherical curvature 619 is approximately 280 mm and the second spherical curvature 620 is approximately 278.09 mm. An efficiency of the device 100, from the display 105 to the eye 611, is approximately between 5 and 30 percent with some embodiments have an efficiency of approximately 10 percent. In arcminutes, an acuity is approximately 2.2. A chief ray telecentricity, as measured at a center pixel of the display 105, is approximately 11 degrees. An eye relief distance 603 between the lightguide 120 and a front (cornea) of the eye 611 is approximately less than 20 mm.

A radius of curvature of the first surface 605 of the field lens 213 is approximately 83.88 mm and a radius of curvature of the second surface 606 of the field lens 213 is approximately 18.725 mm and between approximately 16 mm and approximately 20 mm depending on one or more components in the device 100 and their optical properties. A curvature and properties of the incoupler 607 are provided in and described with respect to FIG. 13. A radius of curvature 609 of the inner curved surface 609 is 17.47 mm. This radius of curvature 609 is symbolically illustrated in FIG. 6 and viewed best in perspective view in FIGS. 1-3.

The combiner surface 617 is positioned at a second angle 634, a pantoscopic tilt angle, relative to a vertical axis in front of the eye 631. According to some embodiments, the second angle 634 is measured from the vertical axis (X axis 644) to a point within the resultant image reflected from, and relative to, the combiner surface 617. A horizontal axis is referred to as a Z axis 645. The axes 644, 645 are reference axes for sag coefficients according to some embodiments further described herein.

By way of example, the second angle 634 is measured relative to a center of the resultant image from the display 105 reflected from the combiner surface 617. As another example, the second angle 634 is measured relative to a center of the combiner surface 617 of the lightguide 120. In some embodiments, the second angle 634 is approximately 4-10 degrees. A combined angle 637, taking the various configurations of all elements of the device 100 into account, including the first angle 633 and the second angle 634 relative to a vertical axis in front of the eye 631, is approximately 6-12 degrees. A first lightguide 120 is provided for a first (right) user eye, and a second lightguide that is optically equivalent to the first lightguide is provided for a second (left) user eye. Each of the first and second lightguides 120 in the device 100 is wrapped approximately 2-7 degrees from a view axis thereby resulting in an overall wrap angle of approximately 5-7 degrees for the device 100. For example, the wrap angle is 6.5 degrees for the device 100 and lightguide 120. According to some embodiments, a wrap angle is at least two degrees relative to the view axis.

According to some embodiments, spherical radii of curvature of spherical surfaces of the lightguide 120 are designed such that an optical power thereof sums to zero (i.e., each lightguide is a zero power shell). In other embodiments, the spherical radii of curvature optically enlarge light passing through the lightguide 120. As shown in other figures, while not illustrated in the view 600, a see-through shell is maintained a small distance from the lightguide 120 resulting in an aesthetically pleasing eyewear device that provides a substantially enlarged display image relative to conventional devices and image viewing systems.

Figure 7:
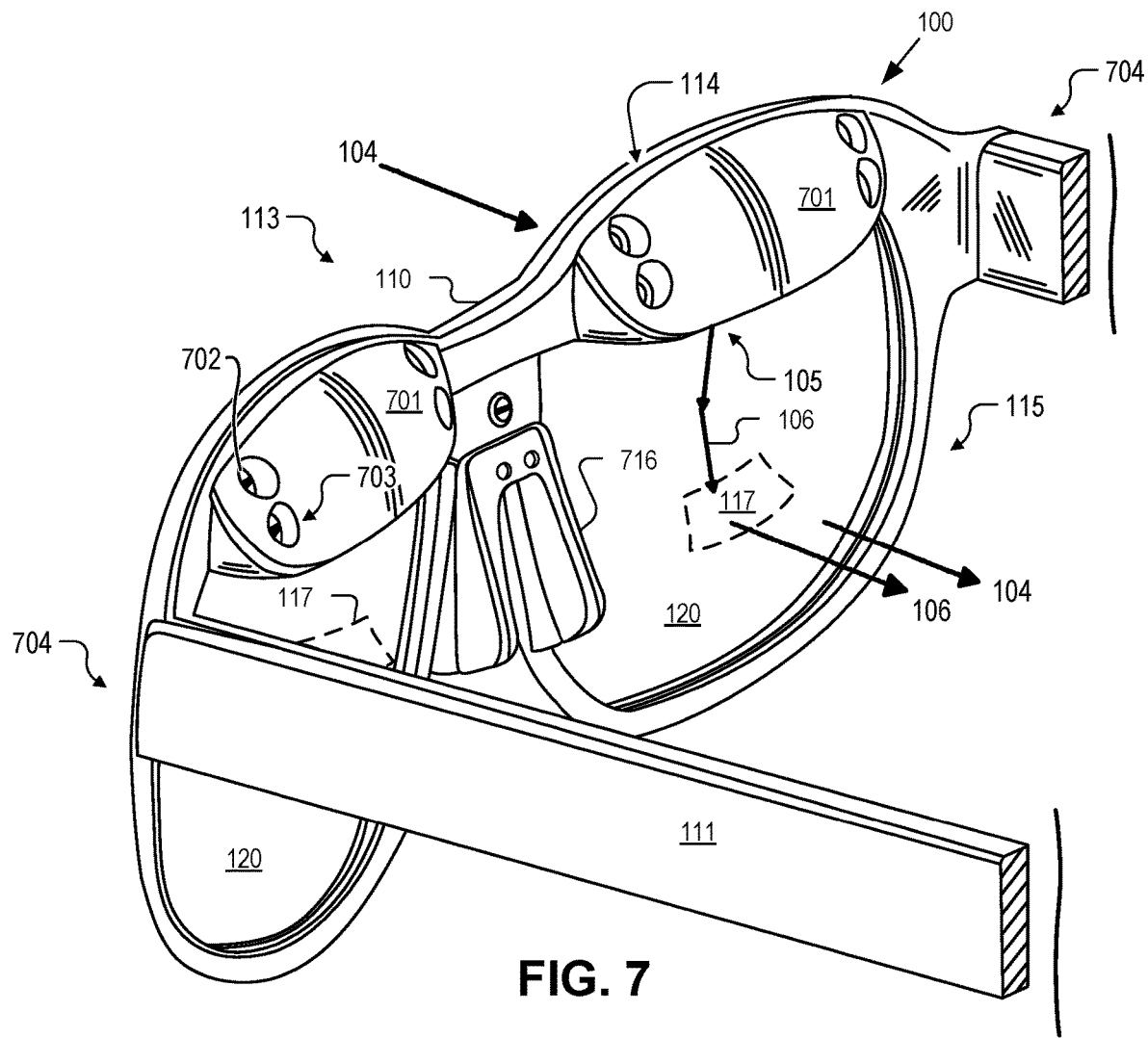
FIG. 7. illustrates a rear perspective view of the eyewear device first shown in FIG. 1 in accordance with some embodiments.

FIG. 7. illustrates a rear perspective view of the eyewear device 100 first shown in FIG. 1 in accordance with some embodiments. The frame 110 supports display housings 701 for the respective displays 105. Each display housing 701 encloses at least a portion of its display 105 and supporting electronic and optic components. Display light 106 leaves each display 105 and enters a respective lightguide 120 from the top side 114 of the device 100. According to some embodiments, the display light 106 is reflected inside and between the surfaces of the lightguide 120 at least one time from a first surface and at least one time from a second surface of the lightguide 120 by total internal reflection (TIR) and, subsequently, the display light 106 is reflected from the combiner 117 toward the user eye. For example, display light 106 is reflected from a dielectric mirror coating of the combiner 117. Light 106 originating from the display 105 then leaves the lightguide 120 toward the eye-ward side 115 of the frame 110 for observation by a user (not illustrated). An arm 111 extends from each of two temple locations 704 of the frame 110. Ambient light 104 from the world-side 113 passes through the lightguides 120 to the eye-ward side 115 of the frame 110. A nose rest 716 is fastened to a central portion of the frame 110 such that the lightguides 120 are positioned in front of user eyes and the frame 110 rests on a nose 602 of a user. Fasteners 702 inside respective fastener recesses 703 secure the display housings 701 and displays 105 to the frame 110 and relative to the lightguides 120. Placement of the displays 105 at the top side 114 of the frame 110 provides bilateral optic symmetry.

Due at least in part to features of the surfaces of the lightguides 120 and a field lens 213 (also referred to as a display lens) positioned between the display 105 and the respective lightguides 120, display light 106 is magnified for the user eyes. For example, the lightguide 120 acts as a magnifier and outputs a 40 degree horizontal by 14 degree vertical field of view at the combiner 117 for a pupil diameter of approximately four mm. The lightguides 120 and displays 105 are positioned relative to one another to provide at least one reflection of total internal reflection on an eye-side surface, and one reflection on the world-side surface of the lightguides 120. A projection from the display 105 then outcouples with light from a world-side of the lightguide 120 through the combiner (region) 117 of the lightguide 120 before reaching the respective eyes of the user.

According to certain embodiments, the eye-side and world-side surfaces of the lightguides 120 have curvature as described in relation to other figures. Each lightguide 120 has a same or similar curvature as the other. Each of these curved surfaces of each lightguide 120 has an approximately same sized characteristic dimension (curve dimension) as each other. A first surface of the lightguide 120 that first receives light from the displays 105 is curved, and, according to certain embodiments, is curved in a spherical manner. A second surface of the lightguide 120 that next receives light from the displays 105 is also curved. In other embodiments, one or more of the first surface and the second surface are freeform in curvature. Having a freeform curvature corrects an astigmatism, if any, in a resultant light field from the display 105 as seen reflected from the dielectric mirror coating of the combiner 117. According to some embodiments, a third or combiner surface of the lightguide 120 is curved in a freeform manner as explained in particular detail with respect to other figures.

Figure 8:
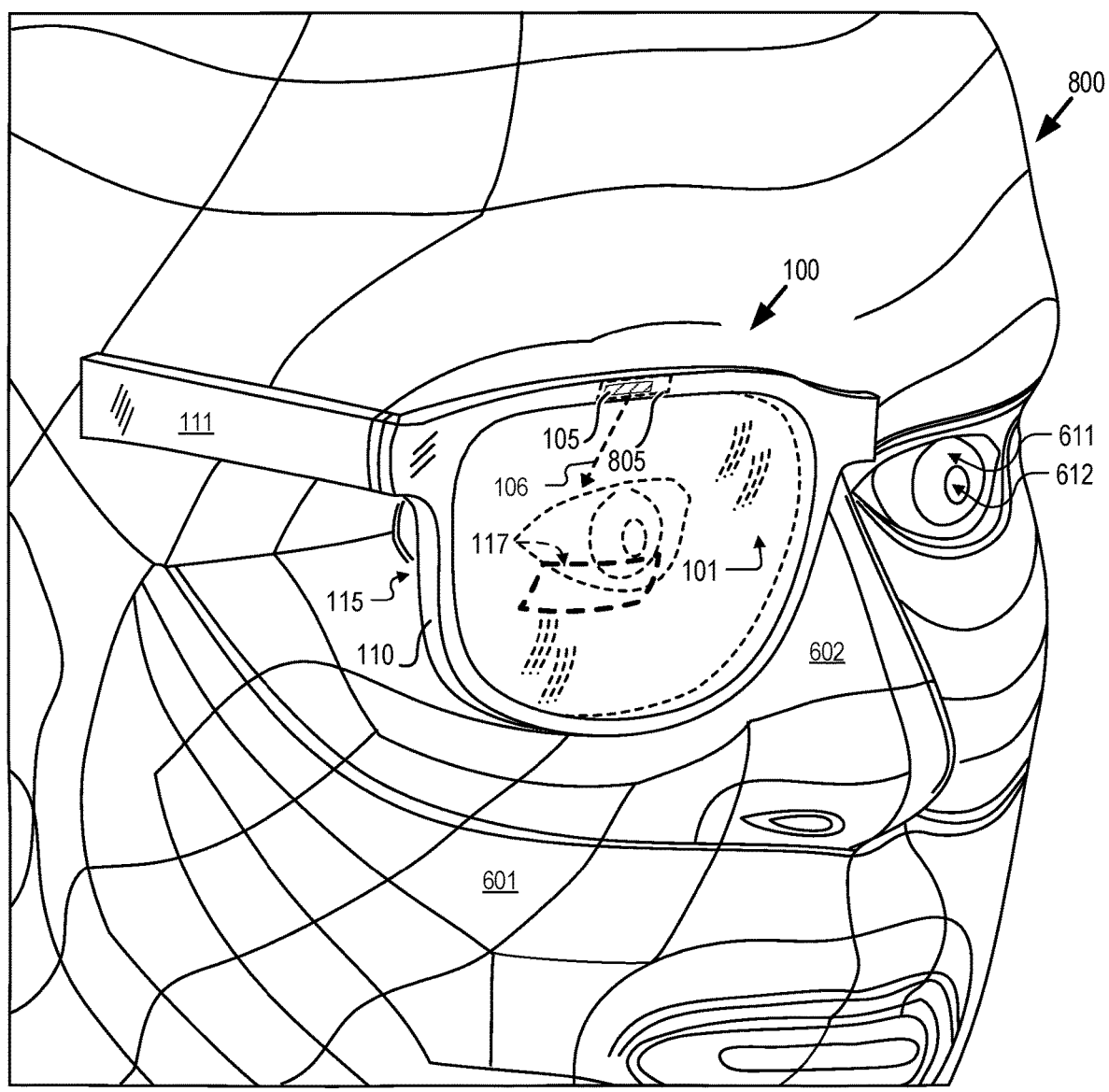
FIG. 8 illustrates a perspective view of the eyewear device first shown in FIG. 1 and as worn by a user in accordance with some embodiments.

FIG. 8 illustrates a perspective view 800 of the eyewear device 100 worn by a user 601 in accordance with some embodiments. Only a right portion of the device 100 is illustrated to expose operation and a position of the device 100 relative to the user eye 611. Light 106 from the display 105 is directed downward and into the lightguide 120 and eventually into the eye 611 at the eye-side 115 of the device 100. The display 105 is mounted inside a compartment 805 in a top portion of the frame 110. The frame 110 rests on a bridge of the nose 602 of the user 601. The display light 106 makes a final reflection from the combiner 117 and into a pupil 612 of the user eye 611. In some embodiments, a center of the combiner 117 is positioned below an optic axis of the eye 611 that extends horizontally in a forward direction out of each pupil 612.

Figure 9:
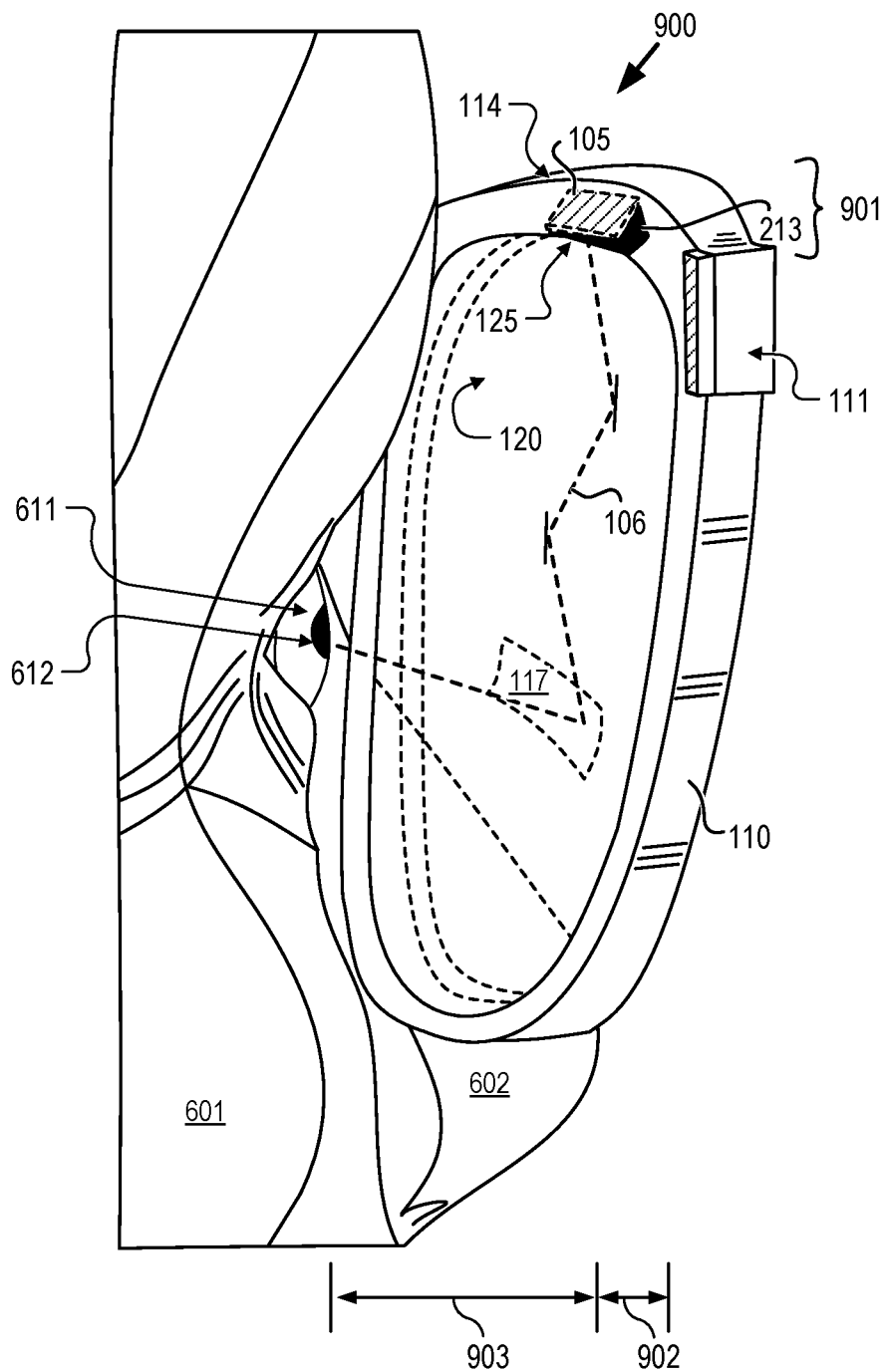
FIG. 9 illustrates a perspective view of the eyewear device from back and right sides.

FIG. 9 illustrates a perspective view 900 of the eyewear device 100 from back and right sides. For clarity, only a right portion of the device 100 is illustrated to expose operation and a position of the device 100 relative to the user eye 611 and pupil 612. A display housing (701) is absent so as to better illustrate the display 105 relative to the lightguide 120. The display 105 is incorporated into the frame 110 between the top side 114 (e.g., top surface) of the frame 110 and the top edge 125 of the lightguide 120. The frame 110 rests on the bridge of the nose 602 of the user 601.

When the display 105 is active, light 106 from the display 105 is first directed toward and into the lightguide 120 of the device 100 through the field lens 213 inside a top portion 901 of the frame 110. In some embodiments, the field lens 213 is made of a material different from that of a material of the lightguide 120 or one or more components 101-103 thereof. That is, a material of the field lens 213 has a first Abbe number different from an Abbe number of a material of the lightguide 120. From the field lens 213, the display light 106 is then directed into a top side of the lightguide 120. The combiner 117 reflects the display light 106 toward and into the pupil 612 of the user eye 611. Although not illustrated, certain components of the device 100 fit within the top portion 901 of the frame 110. The top portion 901 of the device 100 is up to about 3.5 mm in size vertically. For a +0D eye glass device 100 (no vision correction), a lightguide thickness 902 is approximately 4.5 mm or less horizontally. An eye relief distance 903 between the lightguide 120 and a front (cornea) of the eye 611 is approximately 14.5 mm and under 20 mm in some embodiments.

Figure 10:
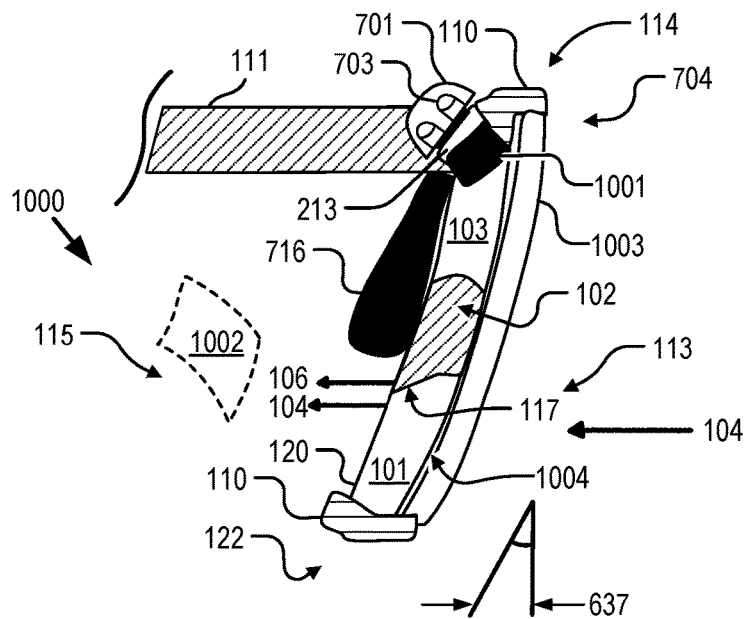
FIG. 10 illustrates a side cross-sectional view of the eyewear device along line 1-1 of FIG. 1 in accordance with some embodiments.

FIG. 10 illustrates a side cross-sectional view 1000 of the eyewear device 100 along line 1-1 of FIG. 1 in accordance with some embodiments. The frame 110 includes the arm 111 mounted thereto at the temple location 704. The frame 110 is visible at the top side 114 and the bottom side 122 of the eyewear device 100. The display housing 701 is mounted in a fixed location and a fixed orientation as shown relative to the lightguide 120 at the top side 114 of the frame 110. The display housing 701 is secured by one or more fasteners such as pins or screws (not illustrated) at or within the fastener recess 703 and secured into one or more of the frame 110 and the lightguide 120. The nose rest 716 is positioned on the frame 110 on the eye-ward side 115 of frame 110. The field lens 213 is positioned at the top side 114 of lightguide 120. A mask 1001 shields light from entering or exiting a space between the display (not illustrated) and the lightguide 120 thereby improving a quality of light directed toward the lightguide 120 from the display and entering the top side 114 of the lightguide 120. The mask 1001 also prevents light 106 from the display directly reaching a user eye on the eye-ward side 115 of the device 100 without passing through the lightguide 120. The mask 1001 shrouds the display so that there is little to no leak of display light outside of the device 100 other than through the lightguide 120. According to some embodiments, the mask 1001 extends around a relevant portion of the perimeter of a top of the lightguide 120 including a surface of the lightguide 120 where light from the display enters the lightguide 120, the display 105, the field lens 213, or a combination thereof.

A combiner surface 117 reflects light 106 from the display that has traveled through the lightguide 120 and directs the light 106 toward the eye-ward side 115 of the device 100. The combiner surface 117 also allows light 104 from the world-side 113 to pass therethrough and combine with light 106 from the display thereby creating a composite image 1002 for an application of AR. The illustrated embodiment of the lightguide 120 includes three pieces: the top (first) component 103, the middle (second) component 102, and the bottom (first) component 103. These optical lightguide components 101-103 are first assembled together and then mounted to the frame 110. In some embodiments, the combiner surface 117 is a surface of the middle component 102 of the lightguide 120. One or more of an eye-side surface and a world-side surface of the lightguide 120 is spherically curved and the lightguide 120 is positioned at an overall pantoscopic tilt angle 637 with respect to the user wearing the device 100. To protect the various components within the frame 110, a thin shell 1003 is positioned in front of the three components 101-103 and is separated therefrom with a small air gap 1004 of approximately 0.15 mm where the thin shell 1003 is approximately 1.45 mm in thickness uniformly over the shell 1003. In some embodiments, the shell 1003 is made of a sunglass-type material that attenuates one or more of a quantity and a quality of world light entering the device 100 from the world-side 113.

Figure 11:
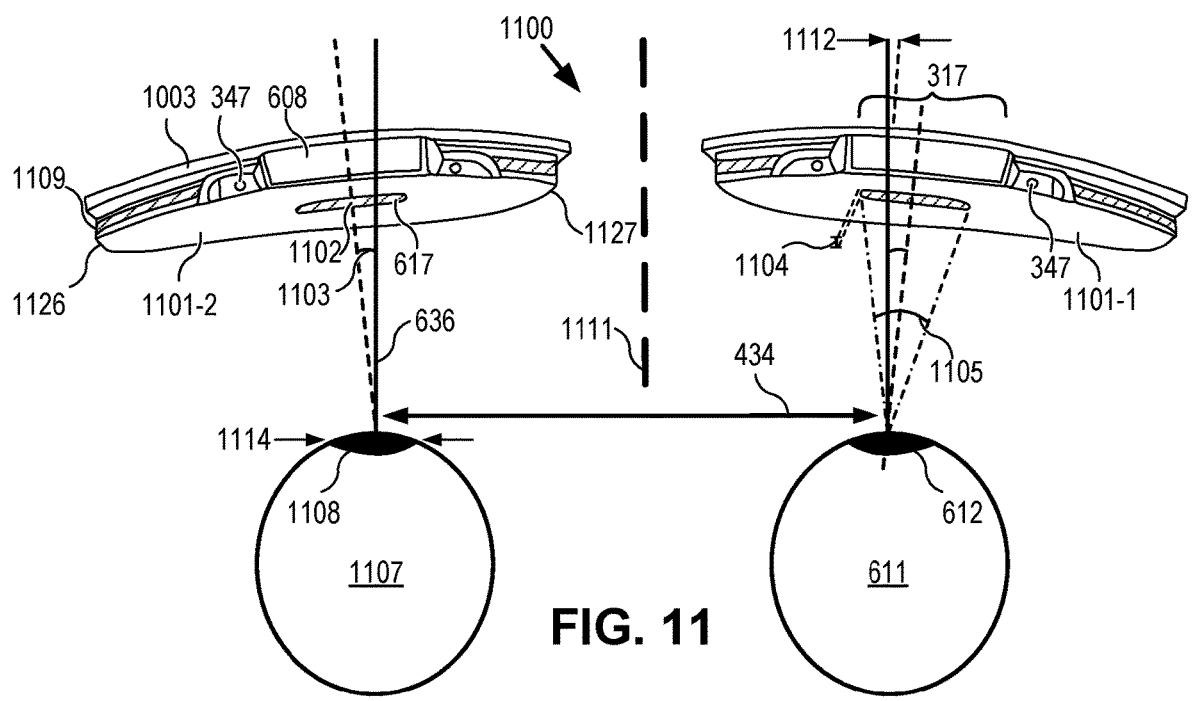
FIG. 11 illustrates an overhead view of two lightguides in accordance with some embodiments.

FIG. 11 illustrates an overhead view 1100 of two lightguides 1101-1, 1101-2 as positioned in the frame 110 as shown in FIG. 1, FIG. 4, and FIG. 7 in accordance with some embodiments. The lightguides 1101-1, 1101-2 are arranged in a binocular arrangement, one for each eye, which facilitates a proper view of content. The first (right) lightguide 1101-1 is positioned in front of a first (right) eye 611 and a first (right) pupil 612. A second (left) lightguide 1101-2 is positioned in front of a second (left) eye 1107 and a second (left) pupil 1108. Each of the lightguides 1101-1, 1101-2 includes one or more grooves 1109 in one or more edges thereof for interfacing with the frame 110 (not illustrated for clarity). For example, a groove 1109 is found in the outer edge 1126 and the inner edge 1127 of each of the lightguides 1101-1, 1101-2. In some embodiments, a transparent shell 1003 is positioned on a world-side of each lightguide 1101-1, 1101-2. A top surface as an incoupler surface 608 receives display light from a display (not illustrated to avoid obscuring some components) is located in a central position at a top edge of each lightguide 1101-1, 1101-2.

The lightguides 1101-1, 1101-2 are positioned an equal distance from a central axis 1111 as evidenced by a respective visual axis 636 for each of the eyes 611, 1107 that extends parallel to the central axis 1111. A center 1102 of a combiner surface 617 in each lightguide 1101-1, 1101-2 is positioned at a first tilt angle 1103 with respect to the respective eye 611, 1107. The first tilt angle 1103 is greater than a second wrap angle 1212 of each of the lightguides 1201-1, 1201-2 where the second wrap angle 1212 is relative to a normal taken from a front surface of the respective lightguides 1101-1, 1101-2. For example, the first tilt angle 1103 is approximately 4-7 degrees while the second wrap angle 1112 is approximately 0.9 degrees. The IPD 434 is approximately 61.2 mm between the visual axis of each eye 611, 1107. Each of the combiner surfaces 617 includes a vertical field size 1104 of at least approximately 10 degrees and a total horizontal field size 1105 of approximately 30 degrees relative to and for each of the pupils 612, 1108 of the first and second eyes 611, 1107 based on a pupil size 1114 of approximately four mm. In some embodiments, the vertical field size 1105 is up to approximately 15 degrees based on a nominal pupil size 1114 of 4.0 mm.

In some embodiments, based on an image offset and geometries of the various components, the FOV of the resultant AR image at the combiner surface 617 is approximately 15 degrees by 5 degrees for a 3:1 aspect ratio for some embodiments of the display 105 and approximately 20 degrees by 2.5 degrees for an 8:1 aspect ratio for other embodiments of the display 105. Overall, a total horizontal FOV (HFOV) 1105 across each of the combiner surfaces is approximately 34 degrees with a nasal side width of at least approximately 10 degrees and a temporal side width of at least another approximately 10 degrees. A binocular overlap is at least approximately 20 degrees.

FIG. 12 illustrates a set of coefficients 1200 characterizing a combiner surface 318 corresponding to a first column of values 1201 in accordance with some embodiments. The coefficients 1200 are commonly referred to as values of a sag coefficients table. A spherical radius of curvature of the combiner surface 318 is approximately 17.47 mm for a radius of curvature 314 of 280 mm (convex) of the world-side surface 313. The example coefficients 1200 are consistent with coefficients and measurements known to those in the optics art for freeform lenses and which satisfy the following sag equation relative to an axis or center of a corresponding spherical lens:

$$sag(x, y) = \frac{(1/R)(x^2 + y^2)}{1 + \sqrt{1 - (1/R^2)(x^2 + y^2)}} + \sum C_{m,n} x^m y^n, \quad \text{(Equation 1)}$$

where m and n and x and y are integers, and where R is a length of the radius of the particular surface. For example, for a first row and first coefficient 1202, m=2 and n=0 corresponds to $C_{2,0}=x^2$ (labeled as X2). For the combiner surface 318, $x^2$ is approximately −8.8614E-03. The values of the other coefficients 1203-1230 for the combiner surface 318 are as shown in FIG. 12 for a curved lightguide such as the lightguide 120 of the device 100.

FIG. 13 illustrates a set of coefficients 1300 characterizing the incoupler surface 608 corresponding to a first column of values 1301 in accordance with some embodiments. For example, for a first row and first coefficient 1302, m=2 and n=0 corresponds to $C_{2,0}=x^2$. For the incoupler surface 608, $x^2$ is approximately −1.9575E-01. The values of the other coefficients 1303-1330 for the incoupler surface 608 are as shown in FIG. 13 for a curved lightguide such as the lightguide 120 of the device 100.

Figure 14:
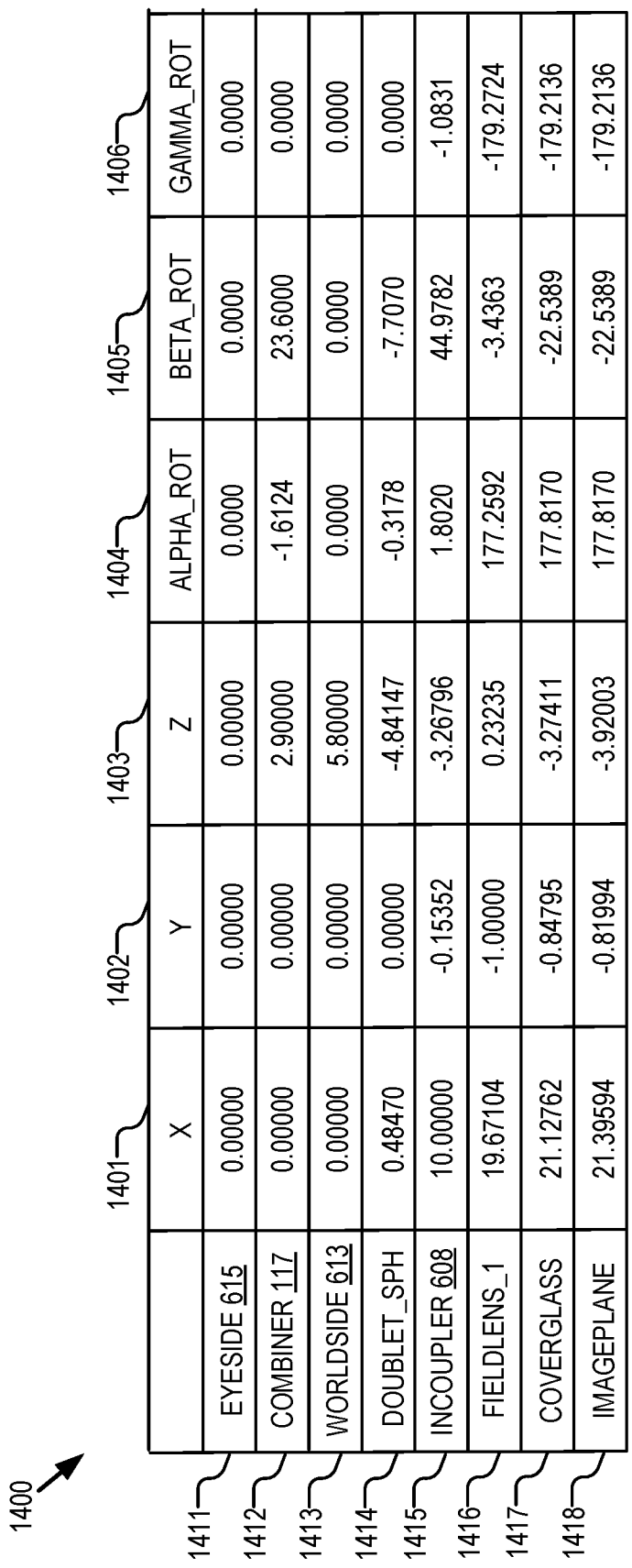

FIG. 14 illustrates a set of coefficients 1400 characterizing several surfaces corresponding to respective rows 1411 through 1418 in a table. The coefficients are global values centered on an eye-side sphere vertex. Each column 1401-1406 corresponds to one of an X dimension 1401, a Y dimension 1402, a Z dimension 1403, an alpha rotation ("ALPHA_ROT") 1404, a beta rotation ("BETA_ROT") 1405, and a gamma rotation ("GAMMA-ROT") 1406 in accordance with some embodiments.

A first row 1411 of the coefficients 1400 corresponds to coefficients for the eye-side surface 615 of the lightguide 120. A second row 1412 of the coefficients 1400 corresponds to coefficients for the combiner surface 117 of the lightguide 120. A third row 1413 of the coefficients 1400 corresponds to coefficients for the world-side surface 613 of the lightguide 120. A fourth row 1414 of the coefficients 1400 corresponds to coefficients for an optical configuration of a doublet equivalent of the lightguide 120; this set of coefficients is labeled as "DOUBLET_SPH". A fifth row 1415 of the coefficients 1400 corresponds to coefficients for the incoupler surface 608 of the lightguide 120. A sixth row 1416 of the coefficients 1400 corresponds to coefficients for a first surface of the field lens 213 ("FIELDLENS_1") of the lightguide 120. A seventh row 1417 of the coefficients 1400 corresponds to coefficients for a cover glass ("COVER-GLASS") for the lightguide 120. An eighth row 1418 of the coefficients 1400 corresponds to coefficients for a resulting image plane ("IMAGEPLANE") of display light 106 that has passed through the lightguide 120. The values of the coefficients 1400 are for a curved lightguide such as the lightguide 120 of the device 100.

In some embodiments, certain aspects of the techniques described above in reference to FIGS. 1-14 may implemented by one or more processors of a processing system executing software such as to generate a signal for the display in the eyewear whereby the signal causes the display to provide light that ultimately is the AR-based image that is viewable by the user eye. The signal may be generated by a software that includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above including operating of the display inside of the eyewear device. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. The benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical device comprising:
a display to emit light based on an input signal;
a lightguide oriented to receive light from the display, wherein the lightguide includes:
a first surface at an eye-side of the optical device;
a second surface at a world-side for reflecting the light through the first surface to a first user eye, wherein the emitted light from the display is reflected by total internal reflection (TIR) within the lightguide;
a first material having a first Abbe number; and
a second material having a second Abbe number different from the first Abbe number, wherein the first material and the second material alter a chromatic aberration of light from the display; and
a head mountable frame supporting the display and the lightguide.

2. The optical device of claim 1, wherein the display is positioned at a top of the head mountable frame.

3. The optical device of claim 1, wherein the first surface, the second surface, or both the first surface and the second surface are curved.

4. The optical device of claim 1, further comprising:
a field lens having a first surface to receive light from the display and a second surface oriented toward an interior of the lightguide, wherein the field lens is positioned at a top side of the lightguide.

5. The optical device of claim 4, wherein the second surface of the field lens is spherical in shape.

6. The optical device of claim 4, wherein the display and the lightguide are positioned relative to one another so as to reflect light at least two times from at least one of the first surface and the second surface of the lightguide before the light from the display reaches the user eye.

7. The optical device of claim 4, wherein the lightguide includes a third surface as an incoupler surface at a top of the lightguide for receiving light from the display.

8. The optical device of claim 4, wherein:
the field lens includes the first material having the first Abbe number; and
at least one of the first surface and the second surface includes the second material having the second Abbe number.

9. The optical device of claim 4, wherein a surface of the field lens, the lightguide, or both the field lens and the lightguide is shaped to correct an astigmatism of a computer-generated image (CGI) of the light from the display in at least one of a first dimension and a second dimension as the light progresses from the display toward the user eye.

10. The optical device of claim 1, wherein the lightguide is a compound component having a first component coupled contiguously to a second component, wherein the second component includes a combiner surface that reflects display light toward the user eye.

11. The optical device of claim 1, wherein the optical device, including the lightguide, has a wrap angle spherically between 5 and 10 degrees in front of both user eyes as measured within a plane that transects both user eyes.

12. The optical device of claim 1, wherein the optical device, including the lightguide, has a pantoscopic tilt angle of between 5 and 15 degrees in front of the user eye.

13. The optical device of claim 1, wherein the display and the lightguide are arranged in the optical device to provide at least a 10 degree diagonal field of view with respect to a resulting image from the display.

14. The optical device of claim 1, wherein a distance between the first surface at the eye-side of the optical device and the second surface of the lightguide is 4.5 mm or less along a cross-section of the lightguide.

15. The optical device of claim 1, wherein an eye relief distance from the first surface of the lightguide to the user eye is 26 mm or less.

16. The optical device of claim 1, wherein a top edge of a resulting image is located at least 2 degrees below a center axis of a pupil of the user eye.

17. A method for altering a chromatic aberration, the method comprising:
 mounting a display to a head mountable frame, wherein the display emits light based on an electronic input signal; and
 mounting a lightguide to the head mountable frame, wherein the lightguide is positioned to receive light from the display, wherein the lightguide includes:
  a first surface at an eye-side of the head mountable frame;
  a second surface at a world-side of the head mountable frame, wherein the second surface is positioned to reflect the emitted display light through the first surface to a first user eye, and wherein the light from the display is reflected by total internal reflection (TIR) within the lightguide;
  a first material having a first Abbe number; and
  a second material having a second Abbe number different from the first Abbe number, wherein the first material and the second material alter a chromatic aberration of the emitted light from the display.

18. The method of claim 17, wherein at least one of the first surface and the second surface is curved along an eye-side of the head mountable frame, and wherein the method further comprises:
 mounting a field lens at a top of the head mountable frame in a light path between the display and the lightguide.

19. An apparatus comprising:
 a display coupled to a head wearable frame; and
 a lightguide coupled to the head wearable frame, wherein the lightguide directs light from the display toward an eye-direction, the lightguide including:
  a transparent first surface on an eye-side of the lightguide;
  a transparent second surface on a world-side of the lightguide;
  a first material having a first Abbe number;
  a second material having a second Abbe number different from the first Abbe number, wherein the first material and the second material alter a chromatic aberration of the light from the display; and
  a transparent curved surface as a combiner surface shaped to:
   reflect the light from the display to a user eye; and
   combine the light from the display with ambient light entering from a world-side through the transparent second surface of the lightguide.

20. The apparatus of claim 19, wherein at least one of the transparent first surface and the transparent second surface of the lightguide is curved toward the eye-side of the lightguide.

* * * * *